(No Model.)

D. BROOKS, Jr.
ELECTRIC CABLE.

No. 459,941. Patented Sept. 22, 1891.

UNITED STATES PATENT OFFICE.

DAVID BROOKS, JR., OF PHILADELPHIA, PENNSYLVANIA.

ELECTRIC CABLE.

SPECIFICATION forming part of Letters Patent No. 459,941, dated September 22, 1891.

Application filed January 14, 1891. Serial No. 377,722. (No model.)

*To all whom it may concern:*

Be it known that I, DAVID BROOKS, Jr., a citizen of the United States, residing in the city and county of Philadelphia, State of Pennsylvania, have invented a new and useful Improvement in Electric Cables, which improvement is fully set forth in the following specification and accompanying drawings.

My invention consists of a novel manner of connecting the sections of a lead or other covered cable, whereby the cable may be readily bent or its direction or course changed.

Figure 1:
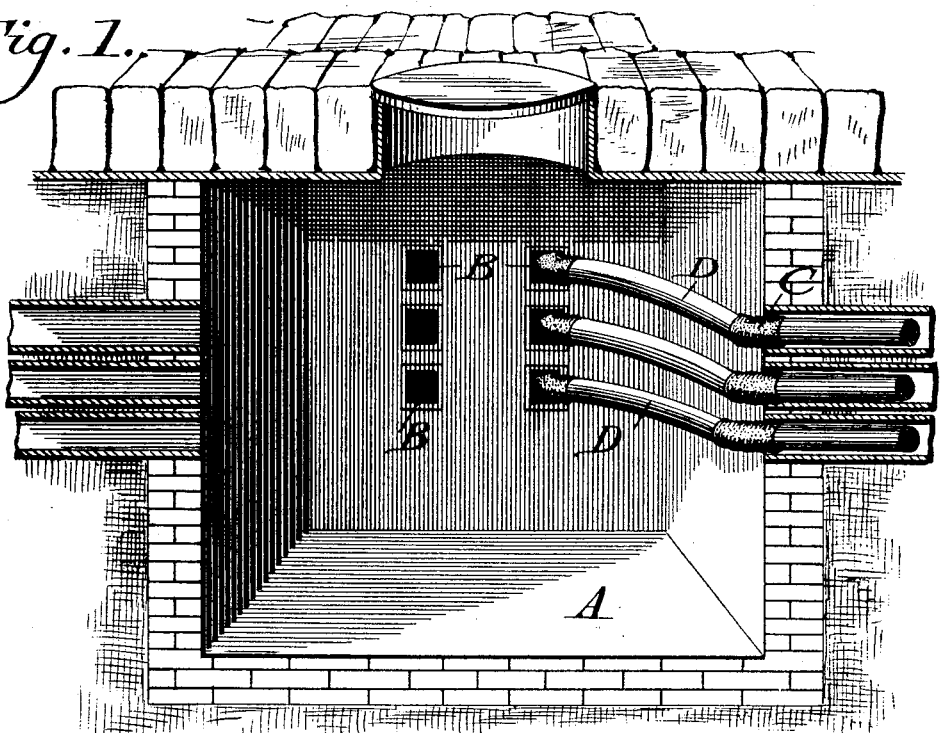
Figure 2:
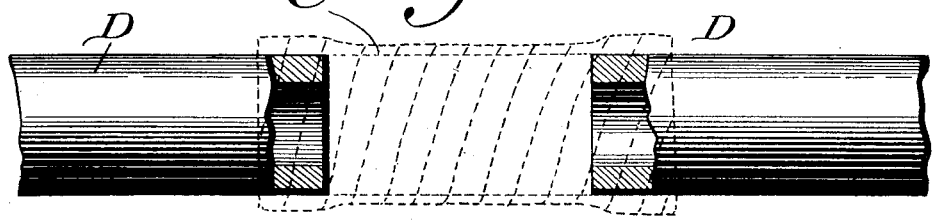
Figure 3:
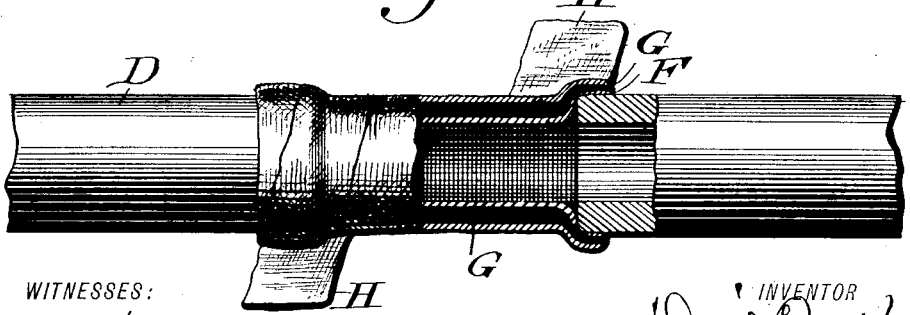

Figure 1 represents a sectional view of a man-hole, showing in conduits leading therein cables having flexible connections embodying my invention. Fig. 2 represents a partial side elevation and partial section of disconnected sections of the covering of a cable as embodied in my invention. Fig. 3 represents a view similar to Fig. 2 with the coupling thereon.

Similar letters of reference indicate corresponding parts in the several figures.

Referring to the drawings, A designates a man-hole, and B and C designate a series of conduits leading therein from different sides thereof, respectively.

D designates the lead coverings of the electric cables in said conduits. It is well known that where a number of cables are placed in one man-hole they require to be bent or have their position and direction changed.

If the cables are of large size and covered with lead it will be almost impossible to bend them at any sharp angle at the point where they emerge from the conduit into the man-hole and the lead covering is liable to break or open at this point. To prevent this the coverings are separated or cut away and a strip of tin-foil F is spirally wound from one covering to the other, the said strip having its edges overlapping and the strip extending a short distance on the ends of the coverings. A strip of rubber G is then wrapped upon the layer of tin-foil F, and another strip of tin-foil H is placed upon the rubber G for additional protection, thus furnishing a wrapping and coupling of great flexibility as well as strength. This method of covering and coupling may be applied to the cable in the center of the man-hole as well as at the sides and is applicable as the cover of a splice in the cable instead of the sleeve with soldered ends, heretofore in use.

Having thus described my invention, what I claim as new, and desire to secure by Letters Patent, is—

1. A cable having the sections of its covering connected by strips of tin-foil and rubber, the same forming a flexible connection, substantially as and for the purpose set forth.

2. A cable having a casing or covering in sections, with a flexible coupling consisting of an inner wrapping of tin-foil with overlapping edges, a layer of rubber thereon, and an outer layer of tin-foil on said rubber, said parts being combined substantially as described.

3. A cable having a casing or covering formed in sections, with a space between adjacent ends thereof, and a wrapping of flexible material coupling said sections and covering said space, the parts being combined substantially as described.

DAVID BROOKS, JR.

Witnesses:
JOHN A. WIEDERSHEIM,
A. P. JENNINGS.